June 7, 1955  J. B. THOMPSON  2,710,112
BAKING PAN
Filed Aug. 6, 1951  2 Sheets-Sheet 1

INVENTOR.
Jerome B. Thompson
BY
Bailey, Stephens & Huettig
ATTORNEYS

June 7, 1955   J. B. THOMPSON   2,710,112
BAKING PAN

Filed Aug. 6, 1951   2 Sheets-Sheet 2

INVENTOR.
Jerome B. Thompson
BY
Bailey, Stephens & Huettig
ATTORNEYS

United States Patent Office

2,710,112
Patented June 7, 1955

2,710,112

BAKING PAN

Jerome B. Thompson, Kansas City, Mo., assignor to C. J. Patterson Company, a corporation of Missouri Application August 6, 1951, Serial No. 240,528

4 Claims. (Cl. 220—63)

This invention is directed to a baking pan. In particular, the invention is directed to a pan having a composite structure of sheet metal and foil metal, and adapted primarily for use in commercial bakeries.

Ordinarily, baking pans are constructed of tin plated sheet iron, or of sheet aluminum. In either case, the pans need to be greased before each use and cleaned thereafter. This is time consuming, expensive, and incurs sanitation problems. Furthermore, baked loaves which stick in poorly greased pans are so mutilated in being removed as to be unsalable.

The objects of this invention are to construct a bread pan which avoids the above disadvantages, which can be reused many times without being greased, from which stuck bread loaves can be removed without damaging the loaf, and by reason of which substantial economies are obtained in the making of baked products.

In general these objects are achieved by constructing a bread pan composed essentially of a loaf forming frame into which a foil metal pan is inserted and locked into place. By giving the foil pan a silicone coating, the pan can be reused many times without being greased or otherwise treated. If a loaf should stick to the foil pan, the foil pan can be released from the frame, stripped from the loaf, and discarded without harm to the loaf. This new structure is adapted to ordinary bake shop routine and produces a considerable savings in operation costs by eliminating pan cleaning, glazing and greasing, and by other inherent economies.

Figure 1:
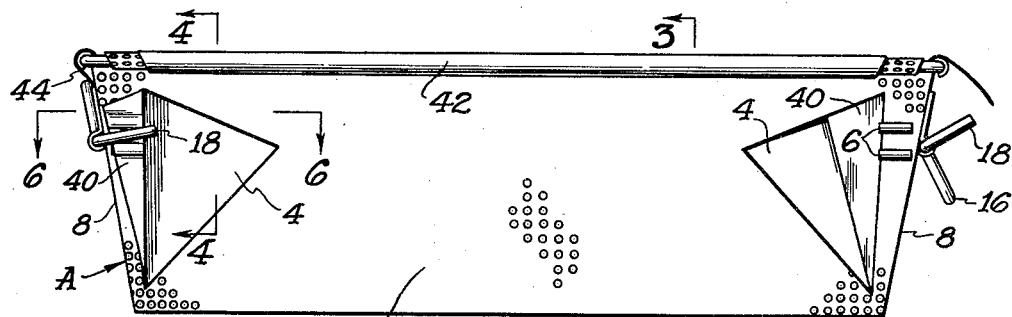
Figure 2:
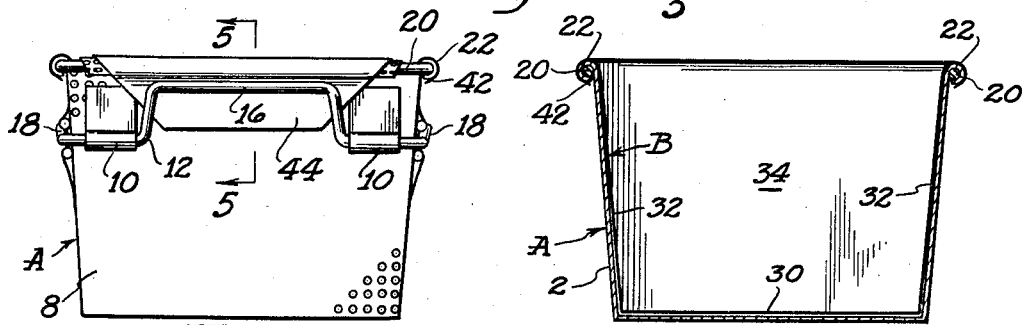
Figure 3:
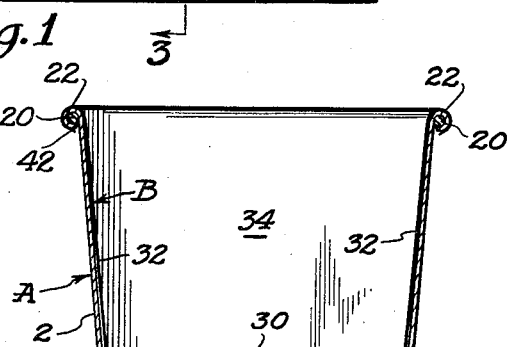
Figure 4:
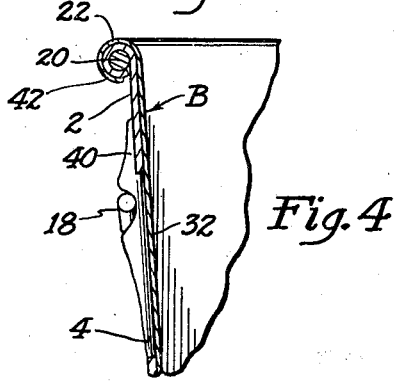
Figure 5:
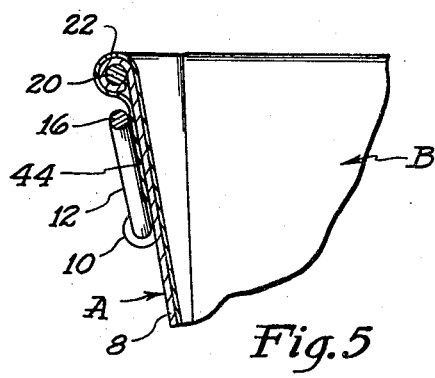
Figure 6:
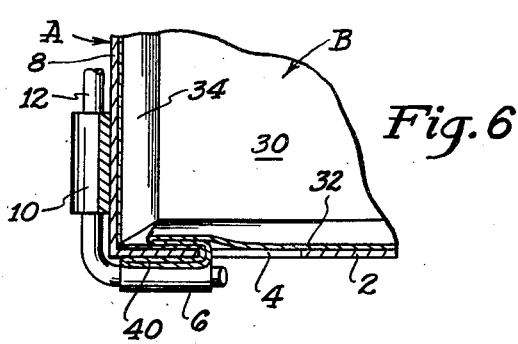
Figure 7:
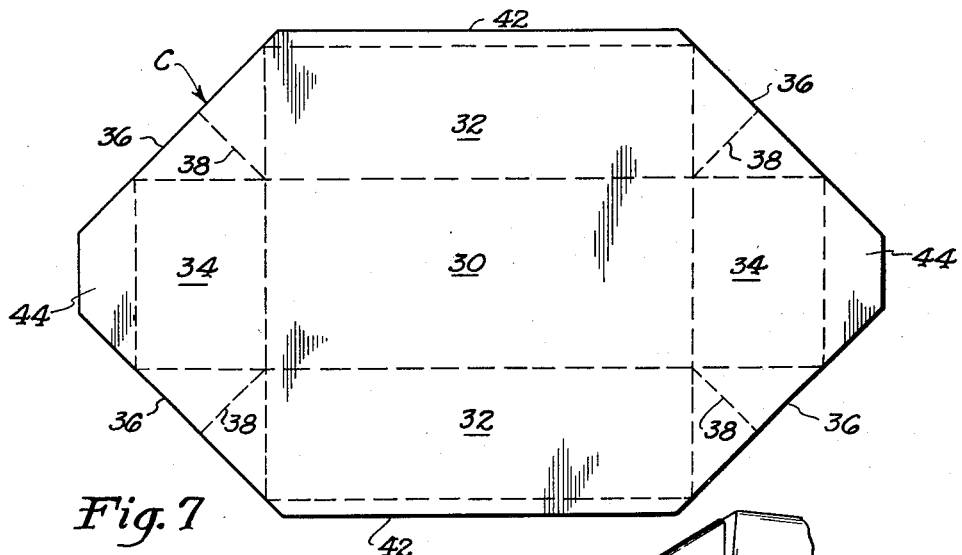
Figure 8:
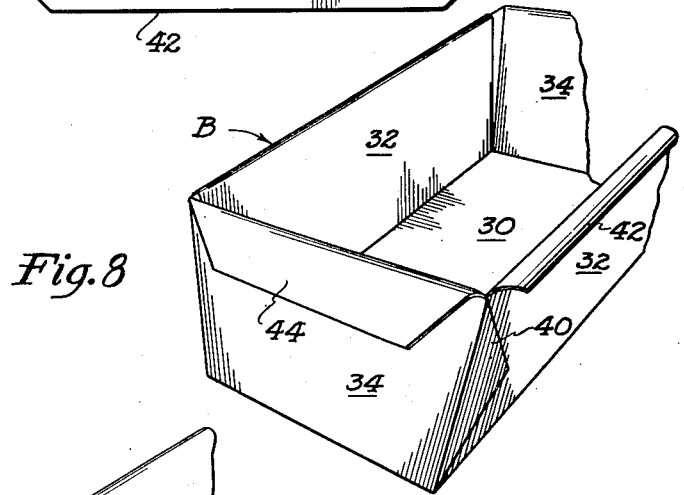
Figure 9:
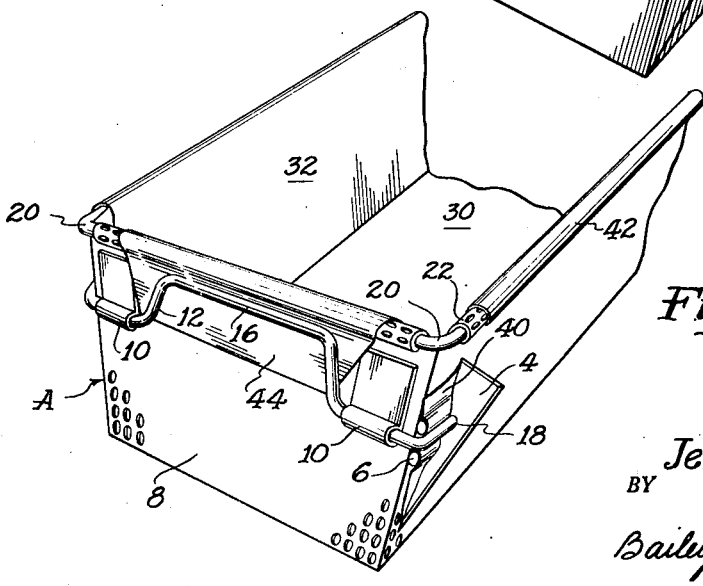

The means by which the objects of the invention are obtained are described more fully in connection with the accompanying drawings, in which:

Figure 1 is a side elevational view of the invention;
Figure 2 is an end elevation view of Figure 1;
Figure 3 is a cross-sectional view on the line 3—3, Figure 1;
Figure 4 is a cross-sectional view on the line 4—4, Figure 1;
Figure 5 is a cross-sectional view on the line 5—5, Figure 2;
Figure 6 is a cross-sectional view on the line 6—6, Figure 1;
Figure 7 is a plan view of a blank from which the foil pan is formed;
Figure 8 is a partial perspective view of the foil pan; and
Figure 9 is a partial perspective view of the baking pan shown in Figure 1.

As seen in the drawings, the baking pan is composed of a loaf forming frame A within which lies a foil pan B.

In the embodiment illustrated, the frame 2 has the shape of an ordinary bread baking pan. Each side wall 2 contains two triangular openings 4 located adjacent the ends of the pan. Between the edge of each opening 4 and the end of the pan are a pair of spaced lugs 6 which may be formed by preformed fittings welded to side 2, by embossing side 2, or by similar devices. Pan 2 as shown is foraminated, but may be of other skeletal construction.

Each end 8 of the frame A has secured thereto, as by welding or the like, a pair of space hinges 10. A clamp 12 is mounted in hinges 10, said clamp having a U-shaped portion 16 intermediate the hinges, and having free end portions 18 bent to extend over sides 2 and having a length to engage between lugs 6.

The upper edges of sides 2 and ends 8 are curled over a rectangular loop of reinforcing wire 20 to form a conventional beaded edge 22.

As seen in Figure 7, the foil pan B begins with a rectangular sheet of material C having truncated corners. Bottom panel 30, side panels 32, and end panels 34 are formed by bending on the dash fold lines indicated. These sides and ends conform to the sides and ends of frame A. The triangular piece of material 36 between each side and end panel is folded on its altitude line 38 outwardly to form a triangular ear 40. Marginal flange portions 42 extend along the outer edges of side panels 32, respectively, and end marginal flange portions 44 prolongate end panels 34.

The composite bread pan is assembled by inserting pan B into frame A. Ears 40 are pulled through openings 4 and laid back over lugs 6. Margin 42 is curled over bead 22, and margin portion 44 folded down over end 8. U-shaped portion 16 of clamp 12 is brought into tight engagement with foil flange 44 by rotating the clamp in hinges 10. Simultaneously, end portions 18 of clamp 12 are brought into locking engagement with foil ears 40 by snapping the resilient portion 18 over one lug, the ends 18 being positioned between lugs 6, respectively, and said lugs functioning as locking detents for the clamps. To release the foil pan B, it is only necessary to rotate the clamp 12 to the position shown on the right hand side of Figure 1, end portions 18 thus becoming disengaged from lugs 6, and then manually stripping foil pan B from frame A.

Foil pan B is coated, preferably, with one of the well known silicones, so that no greasing of pan B is necessary. Tests have shown that upwards of two hundred successive loaves can be baked in the pan of this invention before the silicone coating becomes so worn as to cause the loaf to stick. As the foil pan B can be released from the frame A, should sticking occur, and as the foil can then be stripped from the loaf, an unmutilated salable loaf can be salvaged from a stuck pan, and one saved loaf more than pays for the cost of the foil pan B.

Aluminum foil from 0.002 to 0.010 inch thick, preferably about 0.005 inch thick, constitutes a satisfactory material for pan B. Lighter weights may be used until the foil becomes so thin as to be tearable with ease, and heavier weights are usable until the foil is too thick to bend easily in forming into shape.

The use of foil pan B produces further advantages with respect to the ordinary baking pan, as skeletal frame A retains only so much of the structure of the old pan as is needed to hold foil pan B in shape during the rough handling of baking pans encountered in bake shops. Loaf forming frames A can be made of common black iron sheet metal, thus saving the cost of tin coatings. Such iron can be assembled by welding, which further reduces fabrication costs. The skeletal form saves on the amount of metal required, and further contributes to the production of a better baked product as the oven heat is more quickly and evenly distributed to the loaf through the exposed aluminum foil. Again low maintenance costs are effected by eliminating the cleaning and glazing, and the greasing steps, while at the same time the pans can be more quickly reused. This latter advantage is assisted by the more rapid cooling of the new pans. Furthermore the foil itself can be recoated with silicone and thus have an almost indefinite life. Another advantage lies in the lighter weight of the new pans, this increasing the ease of handling them. All in all, advantages are obtained over conventional pans in substantially every step in which baking pans are used in a bakery.

Although this invention is described with reference to the baking of a loaf of bread, it is applicable to all the various baked products, regardless of size and shape.

Having now described the means by which the objects of the invention are obtained, I claim:

1. A baking pan comprising a skeletal frame formed of sheet metal and conforming to the general outline of the product to be baked, a pan composed of metal foil inserted into said frame, said foil pan having marginal flanges extending over the edges of said frame, ears formed on the sides of said foil pan projecting outwardly through openings in the sides of said frame, and clamping means for locking said marginal flanges and said ears to said pan.

2. A baking pan as in claim 1, said clamping means further comprising a U-shaped clamp hinged to a side of said frame, and having free ends overlapping adjoined sides of said frame.

3. A baking pan as in claim 2, further comprising detent lugs on said adjoined sides, said ears overlapping said lugs, and said free ends locking said ears on said lugs.

4. A baking pan comprising an outer frame having side walls and end walls, an inner metal foil pan having side walls and end walls, means for securing the marginal portions of said pan end walls to the upper edges of the frame end walls, projection means integral with said foil pan and extending through the frame side walls remote from the upper edges thereof, said projection means being laid flatly on the outer surface of said pan side walls, and means attached to said frame for clamping said projection means to said frame.

References Cited in the file of this patent

UNITED STATES PATENTS

| | | |
|---|---|---|
| 1,056,547 | Humphrey | Mar. 18, 1913 |
| 1,098,053 | Porter | May 26, 1917 |
| 1,455,945 | Walton | May 22, 1923 |
| 1,600,741 | Sherman | Sept. 21, 1926 |
| 1,707,655 | Cohn | Apr. 2, 1929 |
| 2,236,992 | Broadley | Apr. 1, 1941 |